United States Patent [19]

Takei et al.

[11] Patent Number: 5,239,384
[45] Date of Patent: Aug. 24, 1993

[54] VIDEO IMAGE RECORDING APPARATUS

[75] Inventors: Masahiro Takei, Yokohama; Makoto Takayama, Kawasaki, both of Japan

[73] Assignee: Canon Kabushiki Kaisha, Tokyo, Japan

[21] Appl. No.: 794,645

[22] Filed: Nov. 18, 1991

Related U.S. Application Data

[60] Continuation of Ser. No. 434,579, Nov. 13, 1989, abandoned, which is a continuation of Ser. No. 320,624, Mar. 8, 1989, abandoned, which is a division of Ser. No. 716,244, Mar. 26, 1985, Pat. No. 4,829,386.

[30] Foreign Application Priority Data

Mar. 30, 1984 [JP] Japan ................... 59-64959

[51] Int. Cl.$^5$ ...................... H04N 5/76; G01D 9/00
[52] U.S. Cl. .................... 358/335; 358/336; 358/296
[58] Field of Search ............ 369/43, 44.32, 44.33, 369/44.27, 54, 32; 360/31, 33.1, 38.1; 346/762, 153.1, 154; 355/5, 7, 8, 20; 358/335, 336, 340, 345, 296, 298, 299, 300, 302

[56] References Cited

U.S. PATENT DOCUMENTS

| | | | |
|---|---|---|---|
| 4,148,043 | 4/1979 | Yamauchi et al. | 346/154 |
| 4,521,102 | 6/1985 | Motomura et al. | 355/207 |
| 4,571,069 | 2/1986 | Kimura et al. | 355/206 |
| 4,768,181 | 8/1988 | Ichinose et al. | 369/54 |

*Primary Examiner*—Donald E. McElheny, Jr.
*Attorney, Agent, or Firm*—Fitzpatrick, Cella, Harper & Scinto

[57] ABSTRACT

A video image apparatus which records an image corresponding to a video signal including synchronizing signals includes detector for detecting a lack of synchronizing signals and controller responsive to the detector for inhibiting the record operation in order to cope satisfactorily with interruption of the input video signal. Preferably, the apparatus further includes a restart unit for restarting the recording operation from the position where the recording operation has stopped after the input video signal has been restored.

43 Claims, 6 Drawing Sheets

VIDEO IMAGE RECORDING APPARATUS

This application is a continuation of application Ser. No. 07/434,579 filed Nov. 13, 1989, abandoned, which is a continuation of application Ser. No. 07/320,624 filed Mar. 8, 1989, abandoned, which is a divisional of Ser. No. 07/716,244 filed Mar. 26, 1985, now U.S. Pat. No. 4,829,386 issued May 9, 1989.

BACKGROUND OF THE INVENTION

1. Field of the Invention

The present invention relates to a video image recording apparatus which records a visible image corresponding to and derived from a composite video signal which contains synchronizing signals.

2. Description of the Prior Art

Recent development of video apparatus are so remarkable that VTRs, video disks, etc. have spread into domestic market. There are increased demands that the images derived from such video apparatus are not only displayed on a television set, but also printed out in a hard copy. In such a case, if all the video signals for one picture are stored in an image memory, a hard copy can be easily obtained using a printer.

The image memory for one picture, however, is very expensive. Also, the printer is expensive. If an inexpensive image memory which has a small capacity is used, the number of samples of an image signal or the number of bits derived at the A/D conversion must be decreased. Thus, the resolution of image is decreased and the quality of a printed image is remarkably degraded.

As a method of providing a hard copy without using an image memory for one picture, it has been proposed to sample a video signal with an appropriate number of sample dots by one or several lines or vertically or horizontally and to store the sampled signals into a memory while recording the sample signals.

According to this method, an image memory for several lines or columns or so will suffice. In this method, however, if, during printing operation, connection between the printer and a video source apparatus which includes a VTR, a video disk or the like is interrupted, or a power supply for the video source apparatus is erroneously turned off, the printer will end recording without recording anything into the recording medium. As a result, the recording medium will be discharged, thereby rendering a sheet of print useless.

SUMMARY OF THE INVENTION

The present invention is made in view of the above situations. An object of the present invention is to provide a new video image recording apparatus which can avoid the above disadvantage.

It is another object of the present invention to provide a new video image recording apparatus which only requires an inexpensive memory of small capacity but which can properly cope with an event such as accidental interruption of a video signal input without causing erroneous or improper operations.

Under these objects, according to the present invention, a video image recording apparatus which records an image corresponding to a video signal which contains synchronizing signals comprises sample means including a memory for sampling the video signal, recording means for recording an image corresponding to the memory output of said sample means in parallel with the sampling operation of said sample means, detection means for detecting a lack of the synchronizing signals, and control means responsive to said detection means for inhibiting the recording operation of said record means.

The above recording means, for example, includes an ink jet recording head and a carrier mechanism which carries the recording medium to the recording head. The control means inhibits operation of the carrier mechanism in response to the detection means.

According to a preferred embodiment, restart means are provided which reopens the recording operation of the recording means at the position, where the recording means is stopped by said control means in response to the lack of synchronizing signals.

When the lack of synchronizing signals is detected, the position of the sampled line or column of video signal is stored. After the normal situation is restored, recording operation is restarted at the position of the sampled line or column stored. Storage of the position of the sampled line or column is possible by counting the number of sampled lines or columns, for example.

In addition to the memory means, the sample means includes a sample and hold circuit and an A/D converter which A/D converts the output of the hold circuit. The above memory stores the output of the A/D converter. The memory has a small capacity which stores sampled data for one or several lines or columns.

Thus, according to an aspect of the present invention, since detection means are provided for detecting a lack of synchronizing signals, included in an input video signal and the detection output stops the operation of the recording means, useless recording operation in response to interruption of the input video signal may be avoided as well as being able to perform a recording operation again on the same medium. Thus, waste of recording materials such as recording media and ink can be prevented.

The above and other objects, aspects and features of the present invention will be apparent from the following description of embodiments thereof with respect to the accompanying drawings.

BRIEF DESCRIPTION OF THE DRAWINGS

Now, preferred embodiments of the present invention will be described with respect to the drawings in which.

DETAILED DESCRIPTION OF THE EMBODIMENTS

Figure 1:
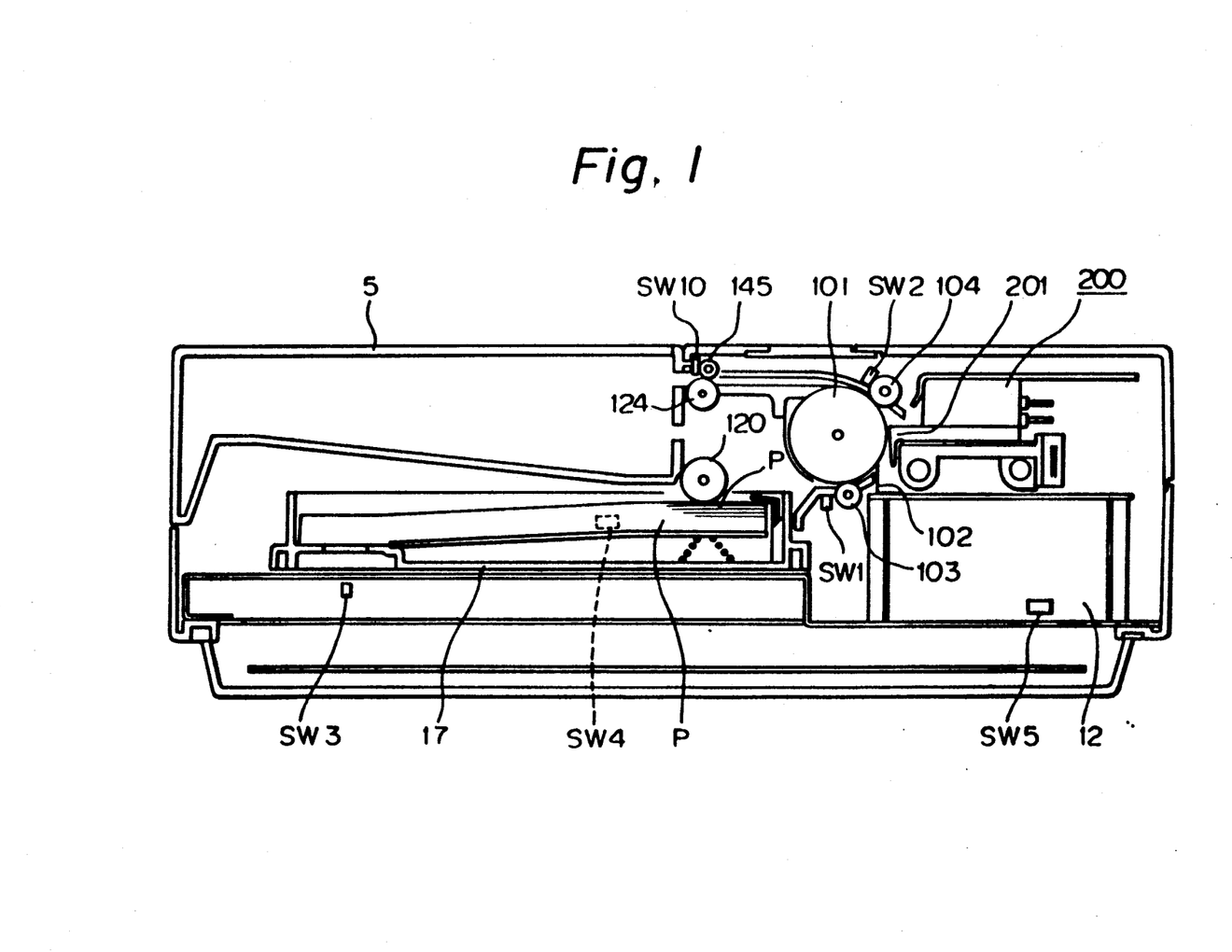
FIG. 1 is a sectional view of one embodiment of the present invention applied to an ink jet printer.

Reference is now made to FIG. 1 in which reference numeral 5 denotes a stacker which accommodates sheets of recording paper which are already recorded. Reference numeral 12 an ink cartridge which contains liquid recording ink. Reference numeral 17 denotes a feed cassette which accommodates a plurality of sheets (unrecorded) of recording paper, P. Reference numeral 101 denotes a platen roller. Reference numeral 102 denotes a press spring which pushes a sheet of recording paper, P, against the platen roller 101. Reference numerals 103, 104, 120 and 124 denote a resist roller, a pinch roller, a pick-up roller (paper feed roller) and a discharge roller, respectively. Reference numeral 200 denotes an ink jet head unit with an ink jet head array 201 being mounted at an end thereof.

The uppermost one of cut-like sheets of recording paper stacked within the feed cassette 17 is picked up by the pick-up roller 120 which rotates at its operating position, and pinched between the resist roller 103 now at rest and the platen roller 101. Since the sheet of recording paper, P, is fed by the pick-up roller 120, it loops between the pick-up roller 120 and the resist roller 103, and oblique motion, etc., of the sheet is corrected. The platen roller 101 then starts to rotate at a appropriate time. This causes the sheet of paper, P, to pass between the press spring 102 and the platen roller 101 and to be pinched between the pinch roller 104 and the platen roller 101. Under these conditions, an ink jet head array 201 reciprocates in directions normal to the face of the sheet of paper while jetting ink drops to record images, characters or the like on the sheet of paper, P. Each time the head array 201 performs a forward or a returning movement, the platen roller 101 rotates through a small angle to perform a secondary scan, i.e. a pitch feed of the sheet of paper, P. The sheet of paper, P, on which the record has been completed is caused to pass between the discharge roller 124 and the pinch roller 145 and to be discharged into the stacker 5 by the discharge roller 124 which rotates at its operating position.

In the printer shown in FIG. 1, various sensors are disposed. That is, SW1, SW2 and SW10 denote recording paper sensing switches disposed in the vicinity of the respective resist and pinch rollers 103, 104 and 145. SW3 denotes a switch to detect the presence of a sheet of recording paper, P, within the feed cassette 17. SW4 denotes a cassette detection switch to detect whether or not the feed cassette 17 is mounted. SW5 denotes a cartridge detection switch to detect whether or not the ink cartridge is mounted.

The electric circuit of the particular embodiment will now be described with respect to FIGS. 2 to 4.

Figure 2:
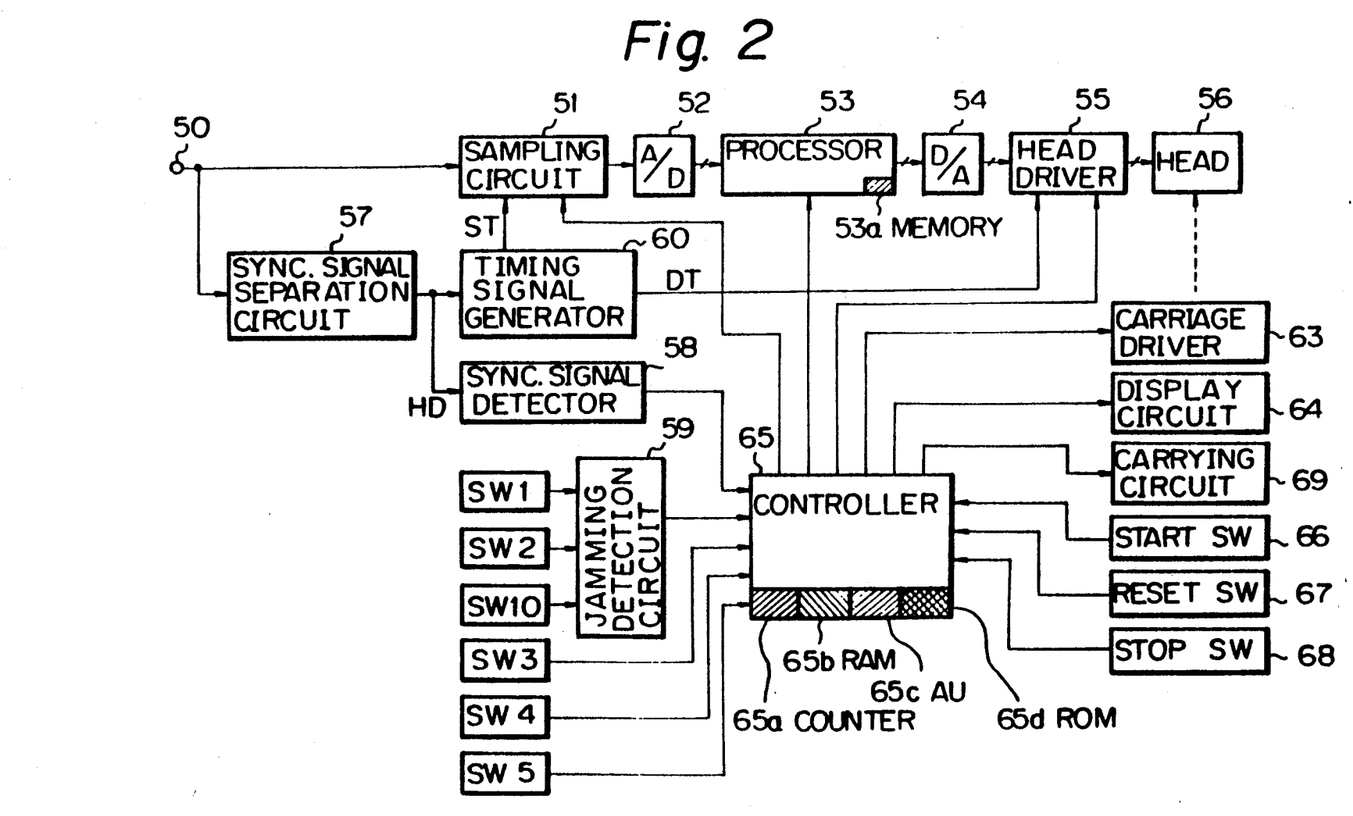
FIG. 2 is a block diagram of the electric circuit included in a printer of FIG. 1.

In FIG. 2, a well-known composite video signal which includes vertical and horizontal synchronizing signals are input via an input terminal 50 and introduced into a sample circuit 51 and a synchronizing signal separation circuit 57. The synchronizing signals separated by the separation circuit 57 are input into a timing signal generator 60 which outputs a sample timing signal ST on the basis of the input synchronizing signal. The sample circuit 51 samples the input video signal in accordance with the sample timing signal ST and outputs the sampled signals to an A/D converter 52 which digitizes the sampled analog video signals. A process circuit 53 performs well-known image processings on the digitized video signals: color correction masking, γ correction, contour emphasis, underlying color removal, black print forming, etc., and produces a final print output signal which is then stored in a line (or column) memory 53a in the process circuit 53. This stored data is then delivered to a D/A converter 54 in which the data is converted into an analog signal for each dot data. This analog signal is then applied to a printer head drive circuit 55. If the printer is of the ink-on-demand type, for example, appropriate voltages ar applied to the respective actuators for piezoelectric elements, etc., in the ink jet heads of the head array 56 (201 in FIG. 1) corresponding to the respective colors (for example yellow, magenta, cyan, black, etc.) to form and jet corresponding ink drops. When the head array 56 completes a record for one line or column, the sample circuit 51 performs the next sample operation. Thereafter, in the same way as above, recording for the next line or column is performed.

On the other hand, the timing signal generator 60 outputs a head drive timing signal DT on the basis of the horizontal synchronizing one of the synchronizing signals separated by the synchronizing signal separation circuit 57. The timing signal DT is delivered to the head drive circuit 55 to be used as a timing signal. The horizontal synchronizing signal HD from the synchronizing signal separation circuit 57 is also input to a horizontal synchronizing signal detection circuit 58 which detects a lack of horizontal synchronizing signals.

Reference numeral 59 denotes a paper jamming detection circuit which detects paper jams in accordance with the outputs of the switches SW1, SW2 and SW10. Since the jam detection circuit 59 is well known in prior art copy apparatus, further description will be omitted. The respective outputs of the detection circuits 58, 59 and the switches SW3, SW4 and SW5 are input to a control circuit 65. When each of the detection circuits 58 and 59 and the switches SW3, SW4 and SW5 detects abnormality, it is arranged to change from "H (high level)" to "L (low level)". The outputs of a start switch 66, a reset switch 67 and a stop switch 68 are also input to the control circuit 65.

The control circuit 65 controls the sample circuit 51, the process circuit 53, the head drive circuit 55, a carriage drive circuit 63, a display circuit 64 and a recording paper carrying circuit 69 on the basis of the 8 input signals. The circuit 69 controls the movement of the pick-up roller 120, the platen roller 101 and the discharge roller 124. The control circuit may be composed of a microcomputer, for example.

Figure 3:
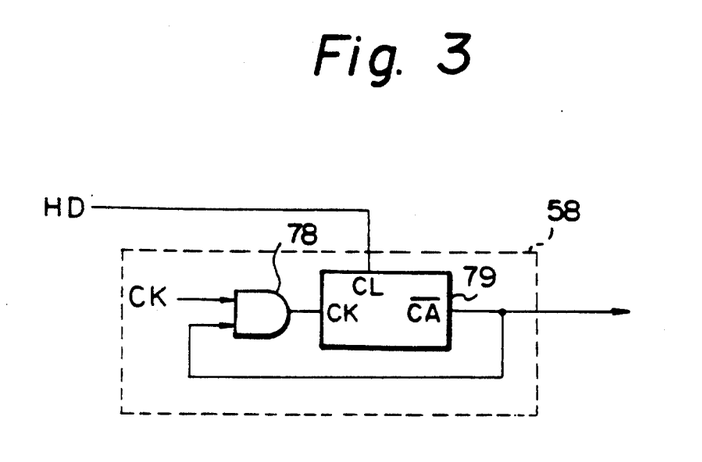
FIG. 3 is a partial circuit diagram illustrating the details of the synchronizing signal detection circuit of FIG. 2.
Figure 4:
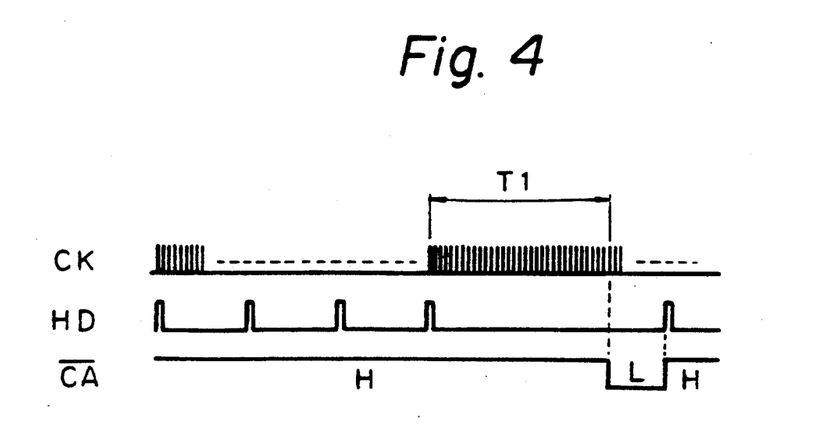
FIG. 4 illustrates signal waveforms at the respective points of the circuit of FIG. 3.

FIG. 3 illustrates the specific circuit of the synchronizing signal detection circuit 58. Reference numeral 79 denotes an adding counter which counts input clock pulses CK and which is cleared by an input horizontal synchronizing signal HD. The number of input clock pulses CK generated for each horizontal interval is 16 for example in the particular embodiment. Assume that the adding counter 79 is a 5-bit counter. When the counter 79 counts 32 clock pulses CK, the carry output $\overline{CA}$ of the counter 79 changes from "H" to "L". Normally, when no horizontal synchronizing signals HD do not fail, the counter 79 is cleared halfway through its counting operation, thereby maintaining the carry output $\overline{CA}$ at "H". If two successive horizontal synchronizing signals HD fail, however, the carry output $\overline{CA}$ changes to "L". Thus, failure of the horizontal synchronizing signals HD is detected. In the particular embodiment, arrangement is made such that when two successive horizontal synchronizing signals HD fail, the carry output $\overline{CA}$ of the counter 79 changes to "L". Alternatively, the number of clock pulses CK produced within a single horizontal interval and/or the preset value of the counter 79 may be altered such that when at least one horizontal synchronizing signal fail, the carry output of the counter 79 changes to "L". In addition, in the particular embodiment, the adding counter 79 is used, but a retriggerable monostable multivibrator may be used instead.

Figure 5:
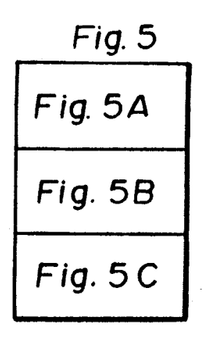
FIG. 5A, 5B and 5C are a flowchart illustrating a flow of operations following a program stored in the control circuit of FIG. 2.
Figure 5A:
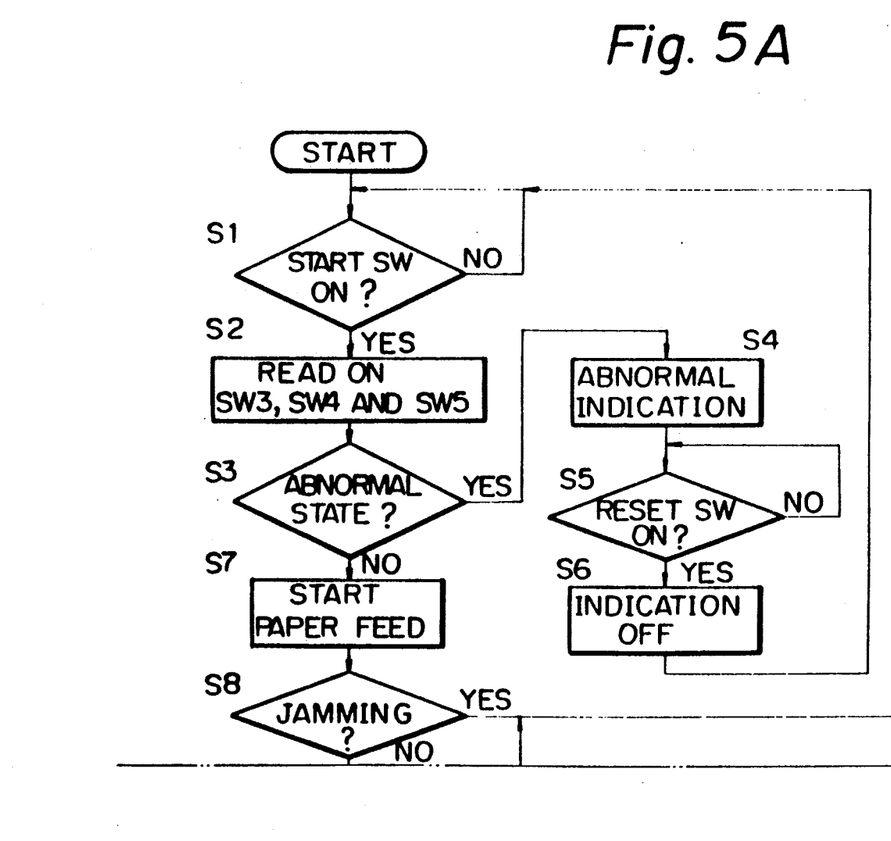
Figure 5B:
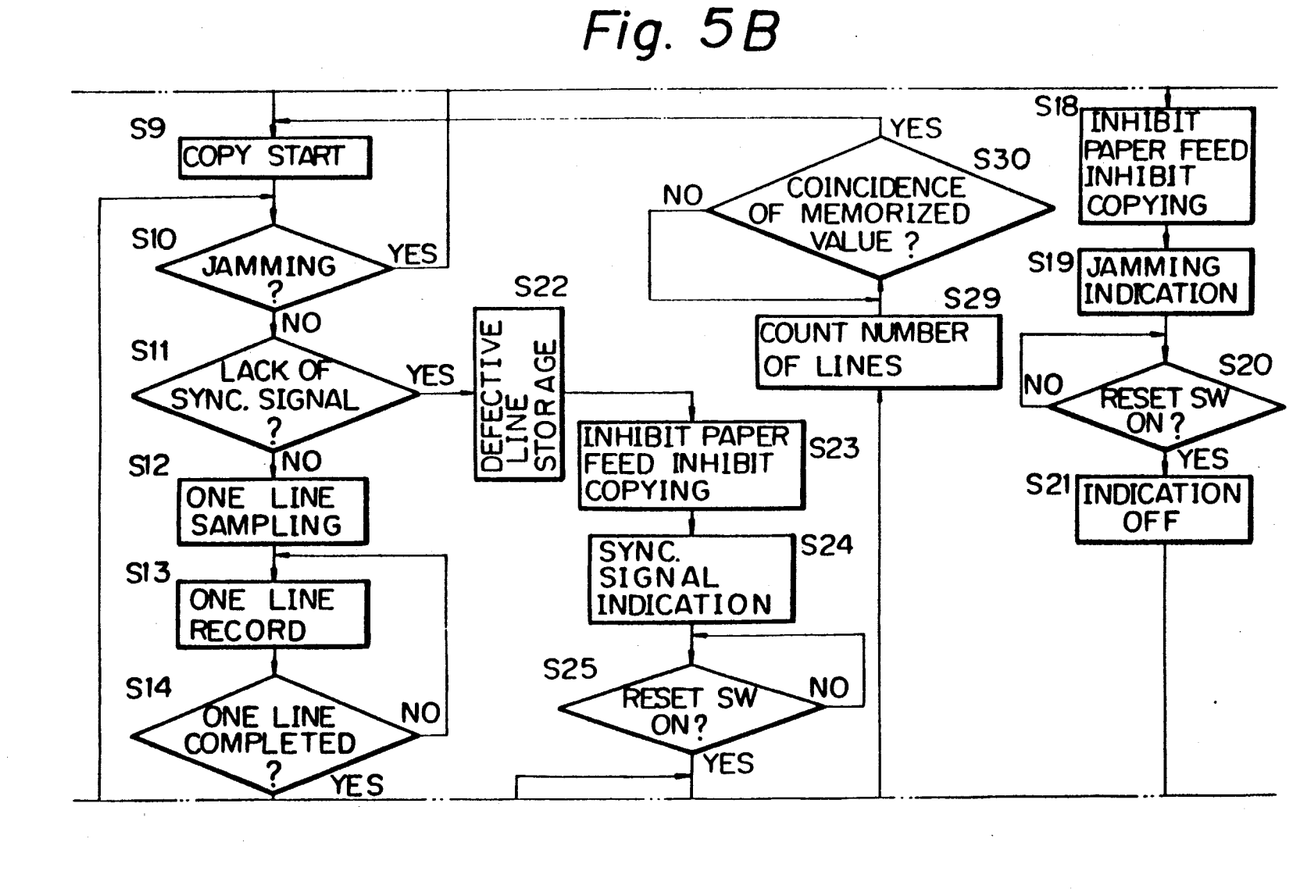
Figure 5C:
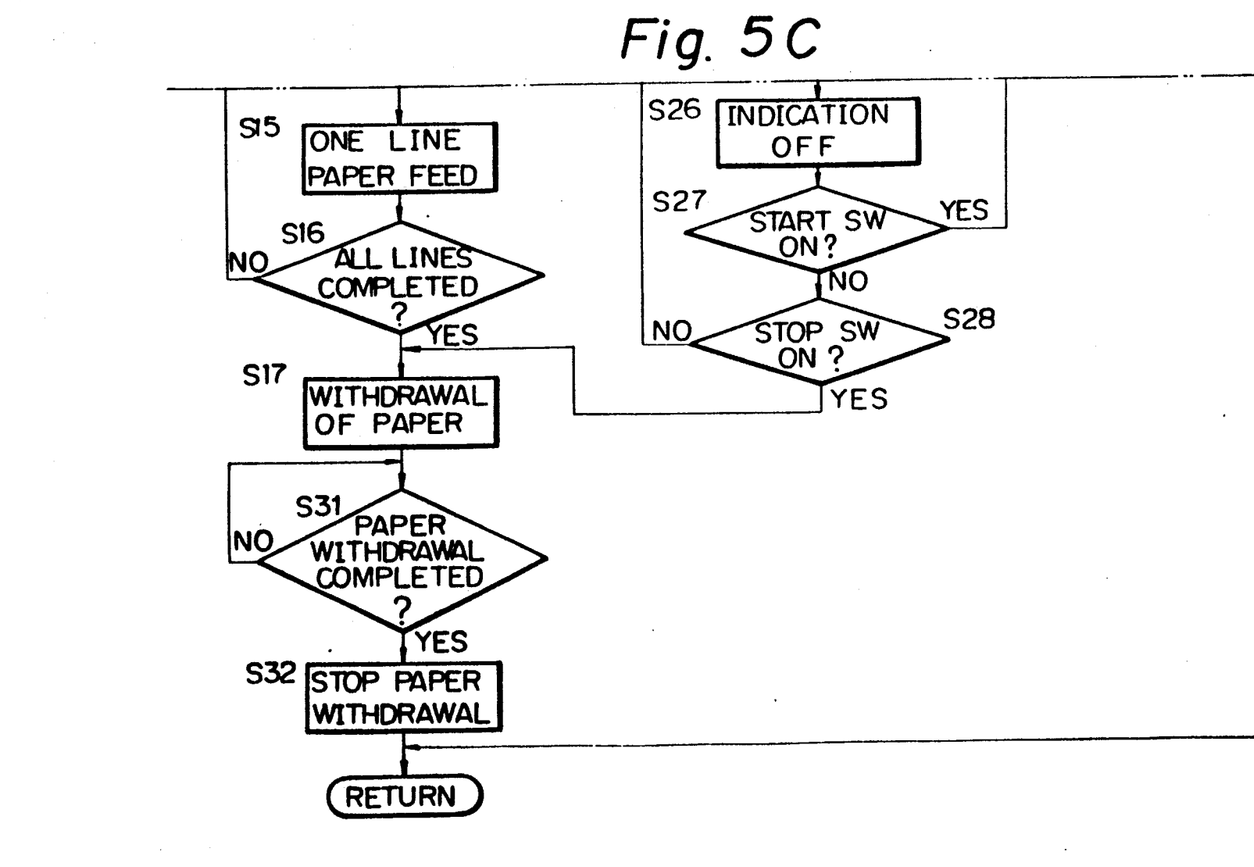

FIG. 5 shows the arrangement of FIGS. 5A, 5B and 5C which illustrate a flow of operation following a program stored in the control circuit of FIG. 3.

When the start switch is turned on (step S1), the respective outputs of the abnormality detection switches SW3, SW4 and SW5 are read (step S2). When the presence of abnormality is detected (step S3), i.e. when no ink cartridge 12 is mounted or when no sheets of recording paper are put within the paper cassette 17, the occurrence of abnormality is indicated (step S4). After normality is restored and when the reset switch 67 is turned on (step S5), the indication of abnormality is turned off (step S6) and control returns to the start (step S1).

When no abnormality is detected (step S3), paper feed starts using paper carrying circuit 69 (step S7). When a sheet of recording paper, P, is fed to a predetermined position with no paper jam being produced, the carry drive circuit 63 and the head driver circuit 55 start a copying operation (step S9).

In the copy operation, first, a video signal is sampled for one line or column (step S12). Thereafter, a record for this line or column is completed (steps S13, S14), at which time the paper carrying circuit 69 feeds recording paper P by an amount corresponding to one line or column in the secondary direction (step S15). When the record for all the lines or columns is completed, the recording paper is discharged (steps S16, S17). Through the copy operation, detection of jam is performed in parallel with detection of a lack of synchronizing signals.

When occurrence of paper jam is detected by the detection circuit 59 (steps S8, S11), paper feed as well as copy operation is inhibited at that time (step S18), thereby performing a jam indication (step S19). When the jammed paper is removed and the reset switch 67 is turned on (step S20), the jam indication is turned off (step S21), and a series of operations starting with paper feed are performed again from the beginning.

On the other hand, when no jams occur, but video inputs are interrupted during copy operation by disconnection of the input connector, troubles with video sources such as a VTR or a video disk, interruption of the power supply or the like and, as a result, when a lack of synchronizing signals HD is detected by the detection circuit 58 (step S11), the position of the line or column which has caused failure of the horizontal synchronizing signals HD is stored (step S22). At the same time, paper feed and copy operations are inhibited (step S23). In addition, failure of the synchronizing signals is indicated by the display circuit 64 (step S24). When troubles are eliminated by reconnection of the video signal input connector or the like and the reset switch 67 is then turned on (step S25), the failure indication is turned off (step S26) and an input to the start switch 66 or the stop switch 68 is awaited (steps S27, S28). When the start switch 66 is turned on (step S27), copy operation starts at the position on the recording paper where copy operation has stopped because this abnormality is not an irrecoverable problem such as a jam. In more detail, when the start switch 66 is turned on (step S27), count of the number of sampled lines or columns starts with the first line or column thereof (step S29). When the count value arrives at the line or column which has caused the lack of horizontal synchronizing signals HD and which has been stored at the step S22 (step S30), copy operation restarts (step S9).

Storage of the line or column which has caused the lack of horizontal synchronizing signals HD at the step S22 and count of the number of sampled lines or columns at the step S29 are performed using a counter 65a and a RAM 65b included in the control circuit 65 (FIG. 2). Also, determination of coincidence at the step S30 is performed using an internal arithmetic and logic circuit 65c (FIG. 2).

On the other hand, when the stop switch 68 is turned on (step S28), copy operation restarts from the beginning so that discharge or withdrawal of the recording paper begins (step S17). After discharge or withdrawal of the paper, the discharge or withdrawal operation stops (steps S31. S32) and control returns to the initial state.

As described above, when synchronizing signals fail, it is possible to restart copy operation as it was last or to restart copy operation from the beginning, thereby avoiding useless prints.

The program which defines the operation flow described above is stored in an internal ROM 65d of the control circuit (FIG. 2).

What we claim is:

1. Video image recording apparatus comprising:
   a memory for storing a video signal of a predetermined length;
   means for forming an image in accordance with the video signal stored in said memory;
   control means for controlling the video signal storing operation in said memory and the image forming operation in said image forming means,
   wherein the operation sequence by said control means includes a recording cycle of storing the video signal of a predetermined length into said memory and then forming the image by said image forming means in accordance with the stored video signal and one complete image is formed by a predetermined number of recording cycles; and
   detection means for detecting whether the video signal is absent for every recording cycle,
   wherein said control means responsive to the detection result of the absence of video signal inhibits the image forming operation in said image forming means.

2. Video image recording apparatus according to claim 1, wherein said detection means detects whether the video signal applied to said memory is absent.

3. Video image recording apparatus according to claim 1, wherein said control means, response to the detection result of the absence of the video signal, stores information as to the number of recording cycles required in forming one complete image, the recording cycle in which the absence of the video signal is detected, and restarts the image forming depending on the stored information so that the image forming is conducted from a recording cycle of the next order of the stored order.

4. Image reproducing apparatus of reproducing on a medium one image composed by a predetermined number of horizontal raster lines;
   a line memory for storing an image signal of one horizontal raster line;
   means for forming the image on the medium in accordance with the stored image signal;
   a microcomputer for controlling said line memory and said forming means to conduct a reproducing cycle of the image signal storing operation in said line memory and then the image forming operation for one line reproduction in said one image, one complete image being reproduced by said predetermined number of the reproducing cycles,
wherein said microcomputer detects whether the image signal is absent for every reproducing cycle and, responsive to the absence of the image signal, suspends the full one line image forming in said image forming means during the reproducing cycle where the absence of the image signal is detected.

5. Image reproducing apparatus according to claim 4, wherein said control means, responsive to the absence of the video signal, stores information as to the number of reproducing cycles required in forming one complete image, the reproducing cycle where the absence of the image signal is detected, and restarts the image forming depending on the stored information so that the image reproducing commences with the image reproducing cycle in the order where the image forming has been suspended.

6. A recording apparatus comprising:
recording means for recording an image on a continuous single sheet recording medium;
detection means for detecting an abnormality in a recording state of the recording apparatus;
memory means for storing a signal which is produced according to a recording position of the continuous single sheet in the recording by said recording means at a time of detecting by said detection means; and
control means for controlling said recording apparatus on the basis of a content of said memory means.

7. A recording apparatus according to claim 6, wherein the recording medium includes a paper.

8. A recording apparatus comprising:
recording medium for recording an image on a recording medium;
detection means for detecting an abnormality in a recording state of the recording apparatus;
memory means for storing a signal which is produced according to a recording position of said recording means at a time of detection by said detection means; and
control means for controlling said recording apparatus on the basis of a content of said memory means;
wherein said recording means comprises ink jet recording means.

9. A recording apparatus comprising:
recording medium for recording an image on a recording medium;
detection means for detecting an abnormality in a recording state of the recording apparatus;
memory means for storing a signal which is produced according to a recording position of said recording means at a time of detection by said detection means; and
controlling means for controlling said recording apparatus on the basis of a content of said memory means;
wherein said recording means comprises means for recording a television image signal.

10. A recording apparatus according to claim 9, wherein said detection means includes means for detecting lack of a sync signal of the television image signal.

11. A recording apparatus comprising:
recording medium for recording an image on a recording medium;
detection means for detecting an abnormality in a recording state of the recording apparatus;
memory means for storing a signal which is produced according to a recording position of said recording means at a time of detection by said detection means; and
control means for controlling said recording apparatus on the basis of a content of said memory means;
wherein said control means controls a timing of a record start of said recording means on the basis of the content of said memory means.

12. A recording apparatus comprising:
printing means for performing a printing operation on a recording medium;
detection means for detecting an abnormality in the recording apparatus;
discharge means for discharging the recording medium;
stop means for stopping the printing operation of said printing means in accordance with a detection result of said detection means; and
control means capable of switching between a first operation mode and a second operation mode,
wherein in the first operation mode said discharge means is operated without the printing means performing the printing operation after the printing operation is stopped by said stop means, and in said second mode, after the printing operation is stopped by said stop means, said discharge means is operated after the printing operation is restarted.

13. A recording apparatus according to claim 12, wherein the recording medium includes a paper.

14. A recording apparatus according to claim 12, wherein said printing means comprises ink jet recording means.

15. A recording apparatus according to claim 12, wherein said printing means comprises means for performing recording of a television image signal.

16. A recording apparatus according to claim 15, wherein said detection means includes means for detecting lack of a sync signal of the television image signal.

17. A recording apparatus according to claim 12, wherein said control means manually switches said first and second modes.

18. A recording apparatus comprising:
supply means for supplying an image signal;
record means for recording an image corresponding to the image signal on a continuous single sheet recording medium;
detection means for detecting an abnormality in said supply means;
memory means for storing a signal which is produced according to a recording position of the continuous single sheet in the recording by said record means at a time of detection by said detection means; and
control means for controlling said record means on the basis of a content of said memory means.

19. An apparatus according to claim 18, wherein the recording medium includes a paper.

20. A recording apparatus comprising:
supply means for supplying an image signal;
record means for recording an image corresponding to the image signal on a recording medium;
detection means for detecting an abnormality in said supply means;
memory means for storing a signal which is produced according to a recording position of said record means at a time of detection by said detection means; and control means for controlling said record means on the basis of a content of said memory means;
wherein said record means comprises ink jet record means.

21. A recording apparatus, comprising:
supply means for supplying an image signal;
record means for recording an image corresponding to the image signal on a recording medium;
detection means for detecting an abnormality in said supply means;
memory means for storing a signal which is produced according to a recording position of said record means at a time of detection by said detection means; and
control means for controlling said record means on the basis of a content of said memory means;
wherein said record means comprises means for recording a television image signal.

22. An apparatus according to claim 21, wherein said detection means includes means for detecting lack of a sync signal of the television image signal.

23. A recording apparatus, comprising:
supply means for supplying an image signal;
record means for recording an image corresponding to the image signal on a recording medium;
detection means for detecting an abnormality in said supply means;
memory means for storing a signal which is produced according to a recording position of said record means at a time of detection by said detection means; and
control means for controlling said record means on the basis of a content of said memory means;
wherein said control means controls a timing of a record start of said record means on the basis of the content of said memory means.

24. A recording apparatus comprising:
record means for recording an image on a continuous single sheet recording medium;
first detection means for detecting an abnormality in said record means before a recording operation;
second detection means for detecting an abnormality in a recording state of said recording apparatus during the recording operation;
memory means for storing a signal which is produced according to the recording position of the continuous single sheet in the recording by said record means at a time of detection by said second detection means; and
control means for controlling said recording apparatus on the basis of a content of said memory means or detection of said first detection means.

25. An apparatus according to claim 24, wherein the recording medium includes a paper.

26. An apparatus according to claim 24, wherein said control means controls a timing of a record start of said record means on a basis of the content of said memory means.

27. A recording apparatus, comprising:
record means for recording an image on a recording medium;
first detection means for detecting an abnormality in said record means before a recording operation;
second detection means for detecting an abnormality in a recording state of said recording apparatus during the recording operation;
memory means for storing a signal which is produced according to a recording position of said record means at a time of detection by said second detection means; and
control means for controlling said recording apparatus on the basis of a content of said memory means or detection of said first detection means;
wherein said record means comprises ink jet record means.

28. A recording apparatus, comprising:
record means for recording an image on a recording medium;
first detection means for detecting an abnormality in said record means before a recording operation;
second detection means for detecting an abnormality in a recording state of said recording apparatus during the recording operation;
memory means for storing a signal which is produced according to a recording position of said record means at a time of detection by said second detection means; and
control means for controlling said recording apparatus on the basis of a content of said memory means or detection of said first detection means;
wherein said record means comprises means for recording a television image signal.

29. An apparatus according to clam 28, wherein said detection means includes means for detecting lack of a sync signal of the television image signal.

30. A recording apparatus, comprising:
record means for recording an image on a recording medium;
first detection means for detecting an abnormality in said record means before a recording operation;
second detection means for detecting an abnormality in a recording state of said recording apparatus during the recording operation;
memory means for storing a signal which is produced according to a recording position of said record means at a time of detection by said second detection means; and
control means for controlling said recording apparatus on the basis of a content of said memory means or detection of said first detection means;
wherein said record means includes an ink jet record means; and wherein said first detection means detects a condition of said ink jet record means being empty of ink.

31. A recording apparatus comprising:
supply means for supplying an image signal;
print means for performing a printing operation corresponding to the image signal on a recording medium;
detection means for detecting an abnormality in said supply means;
discharge means for discharging the recording medium;
stop means for stopping the printing operation of said print means in accordance with a detection result of said detection means; and
control means capable of switching between a first operation mode and a second operation mode,
wherein in said first operation mode said discharge means is operated without said print means performing the printing operation after the printing operation is stopped by said stop means, and in said second operation mode, after the printing operation is stopped by said stop means, said discharge means is operated after the printing operation is restarted.

32. An apparatus according to claim 31, wherein the recording medium includes a paper.

33. An apparatus according to claim 31, wherein said print means comprises ink jet record means.

34. An apparatus according to claim 31, wherein said print means comprises means for performing a recording of a television image signal.

35. An apparatus according to claim 34, wherein said detection means includes means for detecting lack of a sync signal of the television image signal.

36. An apparatus according to claim 31, wherein said control means manually switches between said first and second operation modes.

37. A recording apparatus comprising:
  print means for performing a printing operation on a recording medium;
  first detection means for detecting an abnormality in said print means before the printing operation;
  second detection means for detecting an abnormality in said recording apparatus during the printing operation;
  discharge means for discharging the recording medium;
  stop means for stopping the printing operation of said print means in accordance with a detection result of said second detection means; and
  control means capable of switching between a first operation mode and a second operation mode;
  wherein in said first operation mode said discharge means is operated without said print means performing the printing operation after the printing operation is stopped by said stop means, and in said second mode, after the printing operation is stopped by said stop means, said discharge means is operated after the printing operation is restarted.

38. An apparatus according to claim 37, wherein the recording medium includes a paper.

39. An apparatus according to claim 37, wherein said print means comprises ink jet record means.

40. An apparatus according to claim 37, wherein said print means comprises means for recording a television image signal.

41. An apparatus according to claim 40, wherein said second detection means includes means for detecting lack of a sync signal of the television image signal.

42. An apparatus according to claim 37, wherein said control means controls a timing of a record start of said print means on the basis of the content of said memory means.

43. An apparatus according to clam 37, wherein said print means includes an ink jet record means, and wherein said first detection means detects a condition of said ink jet record means being empty of ink.

* * * * *

UNITED STATES PATENT AND TRADEMARK OFFICE
CERTIFICATE OF CORRECTION

PATENT NO. : 5,239,384
DATED : August 24, 1993
INVENTOR(S) : MASAHIRO TAKEI ET AL.

It is certified that error appears in the above-indentified patent and that said Letters Patent is hereby corrected as shown below:

Title Page:

[57] ABSTRACT, line 3:

Insert --a-- after "signals includes".

COLUMN 1:

Line 36, "lines or" should read --lines or columns--; and
    Line 38, "sample" should read --sampled--.

COLUMN 2

Line 11, "are" should read --is--;
    Line 12, "position," should read --position--; and
    Line 46, "which," should read --which:--.

UNITED STATES PATENT AND TRADEMARK OFFICE
CERTIFICATE OF CORRECTION

PATENT NO. : 5,239,384
DATED : August 24, 1993
INVENTOR(S) : MASAHIRO TAKEI ET AL.

It is certified that error appears in the above-indentified patent and that said Letters Patent is hereby corrected as shown below:

COLUMN 4

Line 30, "level")" should read --level)"--;
    Line 37, "circuit 69" should read --carrying circuit 69--;
    Line 51, "no" should be deleted; and
    Line 64, "fail," should read --fails,--.

COLUMN 6

Line 49, "response" should read --responsive--;
    Line 52, ", the" should read --and the--; and
    Line 58, "of" should read --for--.

COLUMN 7

Line 14, ", the" should read --and the--;
    Line 35, "medium" should read --means--;
    Line 48, "medium" should read --means--; and
    Line 65, "medium" should read --means--.

UNITED STATES PATENT AND TRADEMARK OFFICE
CERTIFICATE OF CORRECTION

PATENT NO. : 5,239,384
DATED : August 24, 1993
INVENTOR(S) : MASAHIRO TAKEI ET AL.

It is certified that error appears in the above-indentified patent and that said Letters Patent is hereby corrected as shown below:

<u>COLUMN 12</u>

Line 24, "clam 37," should read --claim 37,--.

Signed and Sealed this

Seventeenth Day of May, 1994

Attest:

BRUCE LEHMAN

*Attesting Officer*   *Commissioner of Patents and Trademarks*